Sept. 5, 1961     C. T. WINT ET AL     2,999,199
MOTOR POSITION INDICATOR
Filed May 29, 1958     3 Sheets-Sheet 1
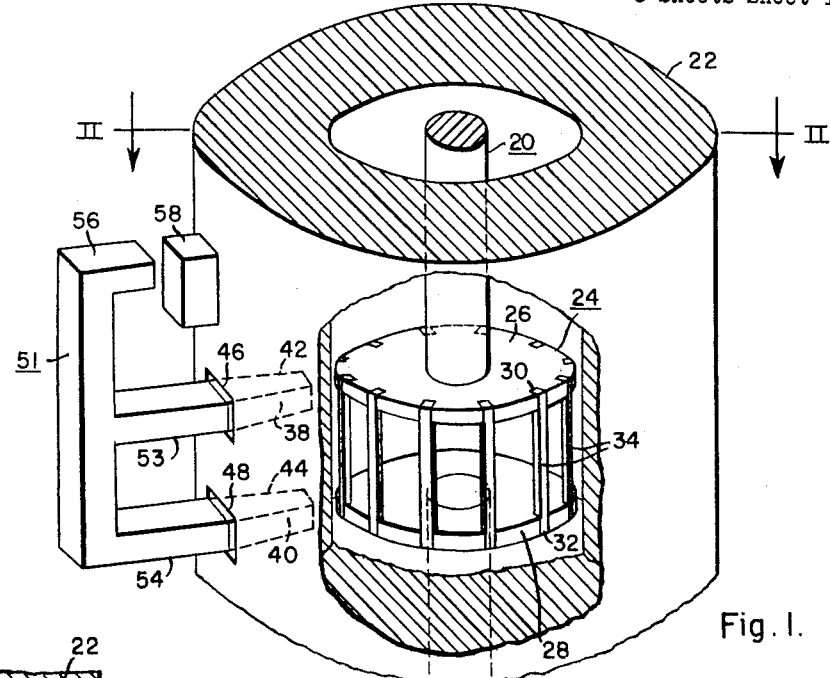
Fig. 1.
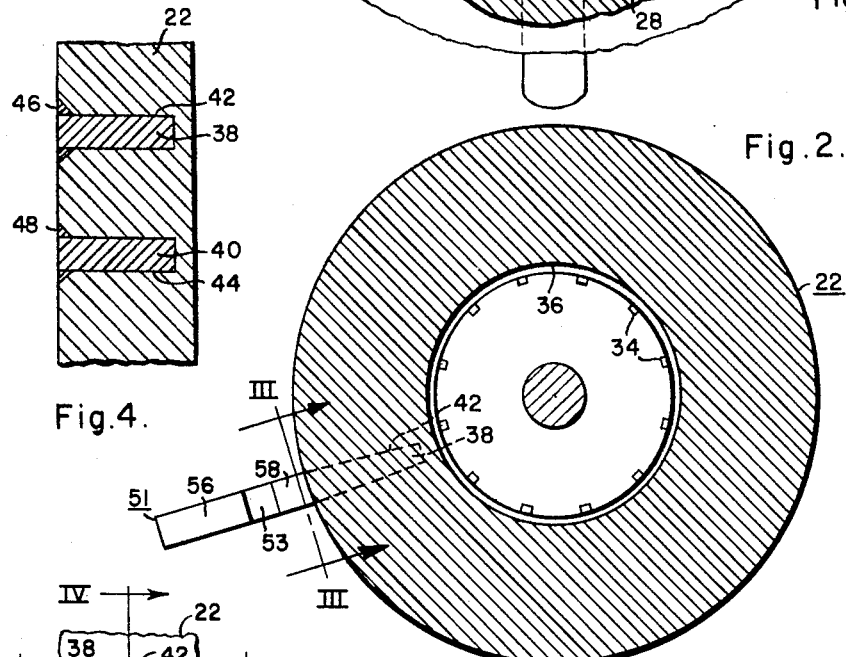
Fig. 2.
Fig. 4.
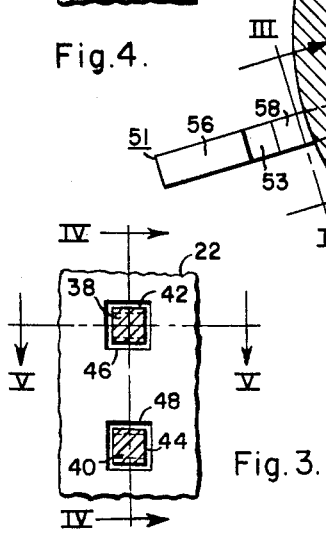
Fig. 3.
Fig. 5.
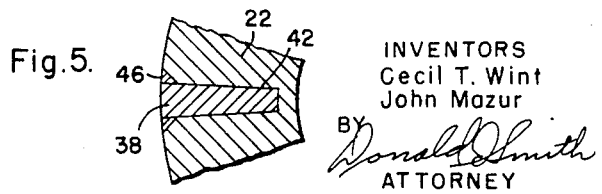
INVENTORS
Cecil T. Wint
John Mazur
BY Donald D. Smith
ATTORNEY

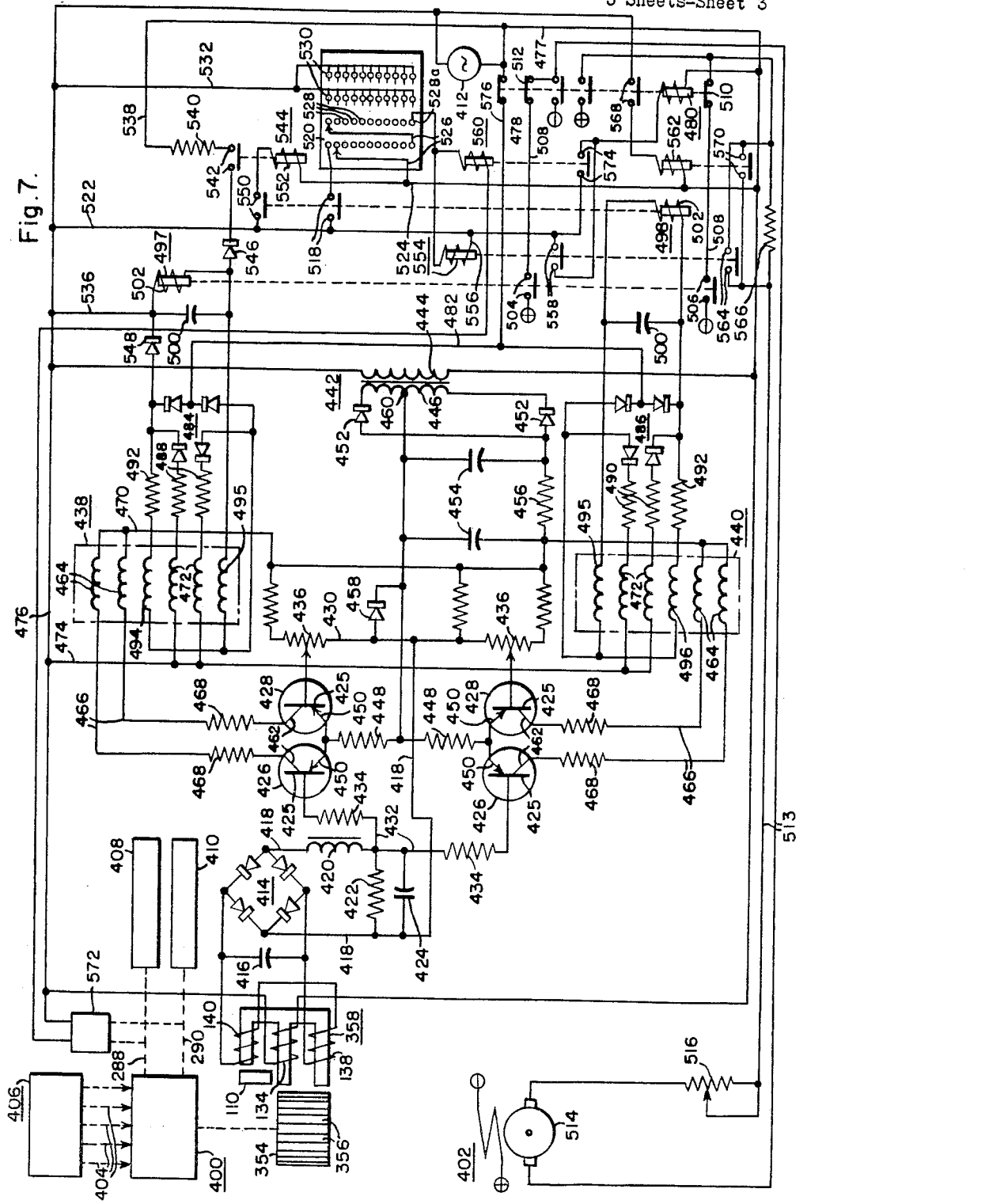

United States Patent Office 2,999,199
Patented Sept. 5, 1961

2,999,199
MOTOR POSITION INDICATOR
Cecil T. Wint, Pittsburgh, and John Mazur, Elizabeth, Pa., assignors to Westinghouse Electric Corporation, East Pittsburgh, Pa., a corporation of Pennsylvania
Filed May 29, 1958, Ser. No. 738,730
8 Claims. (Cl. 318—265)

The present invention relates to position indicators and more particularly to an indicator adapted for use with a rotary element operating within a sealed system or in other relatively inaccessible locations.

In one application of the invention, the position indicator is arranged for use with a rotating valve mechanism employed within a hermetically sealed valve such as that disclosed in a copending application of B. P. Suchoza and J. K. Perhacs entitled "Multi-Port Valve" filed January 24, 1958, Serial No. 710,944 and assigned to the present assignee. It will become apparent, however, as this description proceeds, that the instant invention is readily applicable for indicating the position of any rotatable member such as a driving shaft, the rotor of a dynamo-electric machine, and the like, particularly when mounted within a sealed or otherwise enclosed housing. The invention is also especially adapted for use with an indexing, rotating mechanism such as the multi-port valve mentioned heretofore or for indicating the rotary position of any indexing manufacturing machinery such as the well-known combined sealing and exhausting machine employed in the manufacture of electronic tubes and known as a "Sealex."

In accordance with the invention, the novel position indicator thereof is adapted for use with one or more magnetic inserts or slugs mounted in spaced relationship on a suitable support which is coupled to the rotatable member whose rotary position is desired. When employed within a sealed vessel, means also are associated with the position indicator for effecting magnetic coupling with the aforesaid magnetic inserts through the walls of the vessel for producing a series of pulses expressed as electrical output of the position indicator.

There is also provided in accordance with the invention, novel electric circuitry for utilizing these pulses for suitably controlling the operation of driving means employed to rotate or index the member whose position is being ascertained. In accordance with certain features of the latter form of the invention, the circuit means is arranged to control the time intervals during which the aforesaid driving means is both energized and deenergized in order to effect the aforementioned indexing movements of the rotatable element.

In view of the foregoing, an object of the present invention is to provide a novel and efficient position indicator.

Another object of the invention is to provide a rotary position indicator of the character described adapted for indicating the position of a rotatable element particularly when disposed within a sealed system or other inaccessible location.

A further object of the invention is to provide a novel rotary position indicator capable of yielding electrical pulses in accordance with indexing rotary movement of the rotating member.

Still another object of the invention is to provide a rotary position indicator having a normal steady electrical output which is nulled or diminished at specified angular positions of the rotary element whose position is being indicated.

A still further object of the invention is to provide the last-mentioned form of the position indicator with novel means for adjusting the aforementioned normal electric signal in order to ensure attainment of the aforementioned nulled signals.

Yet another object of the invention is the provision of novel electric circuitry associated with the position indicator of the invention and with suitable driving means for the aforesaid rotatable or otherwise movable element for controlling the operation of the driving means and the movable element in accordance with the electrical output of the position indicator.

Still another object of the invention is the provision of novel electric circuitry associated with the position indicator of the invention, the aforementioned driving means for causing said driving means to impart timed, indexing movement to the movable element.

These and other features, objects and advantages of the invention will be illustrated more fully during the forthcoming description of exemplary forms of the invention with the description being taken in conjunction with the accompanying drawings wherein:

FIGURE 1 is an isometric view of one form of rotary positioning indicator arranged in accordance with the invention with parts thereof being removed and other parts being broken away for purposes of illustration;

FIG. 2 is a cross-sectional view of the rotary position indicator illustrated in FIG. 1 and taken along reference line II—II thereof.

FIG. 3 is a partial view of the position indicator shown in FIG. 2 and taken along reference lines III—III thereof;

FIG. 4 is a cross-sectional view of that portion of the position indicator illustrated in FIG. 3 and taken along reference lines IV—IV thereof;

FIG. 5 is another cross-sectional view of that portion of the position indicator illustrated in FIG. 3 and taken along reference lines V—V thereof;

Figure 6:
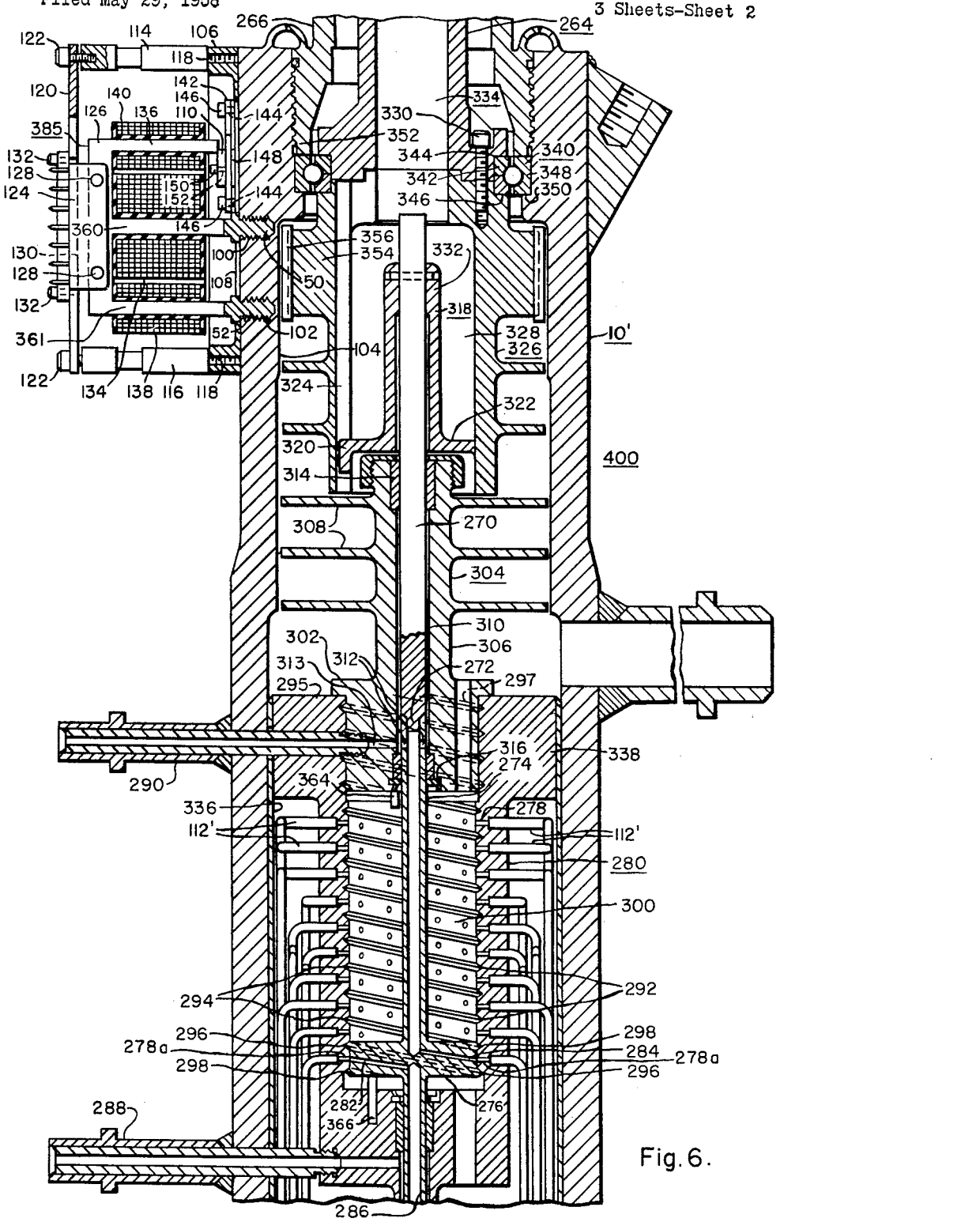

FIG. 6 is a longitudinally sectional view of an illustrative application of the invention showing one form of the rotary position indicator thereof as adapted for use with the aforementioned multi-port valve; and FIG. 7 is a schematic representation of the aforesaid exemplary application of the position indicator including novel circuit means for actuating a driving means for the aforementioned multi-port valve.

Referring now more particularly to FIGS. 1 to 5 of the drawings, an exemplary form of the position indicator, as arranged in accordance with the invention, is adapted for use with a rotatable driving shaft 20 or similar member mounted for rotation within a container or vessel 22. A suitable supporting member 24 is mounted on the driving shaft 20 for rotation therewith. In this arrangement, the supporting member 24 comprises a pair of spaced discs 26 and 28, with pairs of aligned notches 30 and 32 being disposed in the outer peripheral edges respectively of the discs 26 and 28.

A plurality of magnetic slugs or inserts 34 are inserted respectively into each pair of notches 30 and 32. The notches 30 and 32 are aligned in this arrangement with the longitudinal axis of the driving shaft 20 and accordingly the magnetic slugs 34 similarly are aligned. In this arrangement, twelve such magnetic slugs 34 are employed and are spaced about the outer periphery of the supporting member 24 in accordance with selected angular positions of the driving shaft 20, as described hereinafter in greater detail.

As better shown in FIG. 2 of the drawings, the outer periphery of the supporting member 24 and hence the magnetic slugs 34 are disposed adjacent the inner wall surface 36 of the container 22. In accordance with the invention, the magnetic slugs are fabricated desirably from a material of relatively high magnetic permeability such as iron, low carbon steel, silicon steel, or magnetic stainless steel, while the adjacent walls of the vessel 22 are formed from a non-magnetic material such as non-magnetic stainless steel.

Further, in accordance with the invention, a pair of magnetic inserts 38 and 40 are inserted respectively into a pair of radially disposed cavities 42 and 44 which extend most of the distance through the wall of the vessel 22 and open at the outer peripheral surface thereof. Desirably, the walls of the cavities 42 and 44 are tapered and the magnetic inserts 38 and 40 are complementarily tapered in order to promote frictional clamping ttherebetween when the magnetic inserts 38 and 40 are driven into the cavities 42 and 44. The magnetic inserts 38 and 40 can further be secured within the associated cavities 42 and 44 by means of structural welds 46 and 48, respectively, or alternatively, the magnetic inserts can be threadedly secured within appropriate cavities in the manner described hereinafter in connection with the inserts 50 and 52 shown in FIG. 6.

When thus positioned, the inner ends of the magnetic inserts 38 and 40 are disposed adjacent the ends, respectively, of the magnetic slugs 34, as the latter are rotated to positions adjacent or juxtaposed to the magnetic inserts 38 and 40. In this fashion, a magnetic circuit can be established through the magnetic inserts 38 and 40 and each one of the magnetic slugs 34 as the latter are each moved to a position juxtaposed to the inner ends of the magnetic inserts 38 and 40. It will be appreciated that the aforesaid magnetic circuit is attainable although an effective air gap will exist between the inner ends of the magnetic inserts 38 and 40 and the ends of a given magnetic slug 34, respectively. This air gap, of course, can be diminished by extending the magnetic inserts 38 and 40 and their associated cavities farther through the wall of the container 22 or entirely through this wall portion. However, the latter case is not desirable in those cases wherein the driving shaft 20 and associated components are hermetically sealed within the vessel 22 and zero leakage is specified.

An E-core transformer denoted generally by the reference numeral 51 is mounted adjacent the container 22 at a position such that two legs thereof, 53 and 54 are juxtaposed respectively to the magnetic inserts 38 and 40. The central leg 53 of the E-core transformer is provided with a suitable primary winding such as that described hereinafter in FIGS. 6 and 7 of the drawings, while the leg 54 and a fore-shortened third leg 56 of the E-core are furnished with secondary windings. As shown in FIG. 7, the aforesaid primary winding is coupled to a source of alternating potential while the outputs of the secondary windings in one arrangement are combined in electrical opposition.

Mounted upon the container 22 is a relatively fixed magnetic slug 58 disposed in magnetic coupling relationship with the short secondary leg 56 and the central primary leg 53 of the E-core transformer 51. With this arrangement, an output voltage normally is induced in the secondary winding associated with the secondary leg 56. However, when one of the magnetic slugs 34 is disposed adjacent the inward ends of the magnetic inserts 38 and 40, by suitable rotation of the driving shaft 20, a similar voltage is induced in the secondary winding associated with the other secondary leg 54. The fixed magnetic slug 58 is so disposed that during the last-mentioned condition, the output voltage of the aforesaid opposed secondary windings becomes reduced substantially or essentially zero. Thus, the output voltage of the E-core transformer 51 proceeds from maximum to minimum and back to maximum as each of the rotatable slugs 34 approaches, reaches and goes beyond the null or juxtaposed position relative to the inward ends of the magnetic inserts 38 and 40. Accordingly, a series of "troughs" will occur in the output voltage of the E-core transformer with twelve such troughs appearing for each revolution of the driving shaft 20 in this arrangement.

It would be possible to operate the position indicator invention without the use of the relatively fixed magnetic slug 58, in which case a series of peaks in the output voltage of the E-core transformer 51 would result. It has been found, however, that the driving mechanism associated with the driving shaft 20 can be controlled more easily when the controlling circuitry associated therewith and described hereinafter is actuated by means of a series of voltage troughs or null points rather than a series of voltage peaks. It is also contemplated that the outputs of the aforesaid secondary windings can be connected in elctrical series to produce the aforesaid series of voltage peaks.

Referring now to FIG. 6 of the drawings, an exemplary application of the rotary position indicator is shown therein. In this arrangement of the invention, the rotary position indicator is adatped for use with a hermetically sealed valve or the like, such as the multi-port valve described in the forementioned copending application.

In the arrangement of the invention according to FIG. 6, then, the multi-port valve is driven by a rotor 264, the lower end portion of which appears in FIGURE 6, and by a stator (not shown) similar to that illustrated in FIG. 1A of the aforesaid copending application. The rotor 264 is, in this example, hermetically sealed within a rotor enclosure 266. The rotor enclosure 266 is generally of the same configuration as the rotor enclosure 14 shown in FIG. 1A of the aforesaid copending application with the exception that the top or upward end (not shown) of the rotor enclosure 266 is completely closed or made into a continuous wall portion. The rotor 264 is arranged to impart driving torque to a driving shaft 270, which is coupled through linear motion linkage, presently to be described, to the lower end of the rotor 264.

The lower end of the driving shaft 270 is attached by means of welding at its projecting stud portion 272 to a tubular conduit 274. The conduit 274 in turn is joined at its lower end to a port selecting conduit member 276. The conduit member 276 is arranged for communication at selected positions thereof with a given pair of inlet ports 278 of a hollow casing 280. The casing 280 is cylindrical in form, and the inlet ports 278 thereof are coupled to conduits 112′. The connecting conduits 112′ in turn are coupled to external testing stations or sampling means (not shown), for example in the manner described in the aforementioned copending application.

In the arrangement shown in FIG. 6 the conduit member 276 is provided with a pair of inclined flow passages 284 and 282 which are coupled respectively through the conduit 274 and through another conduit 286, secured to the under surface of the conduit member 276, to a pair of outlet ports 288 and 290. The conduits 274 and 286 are arranged for rotary and linear movement with the conduit member 276. In this manner the flow passages 282 and 284 of the conduit member 276 are continuously coupled to the outlet ports 288 and 290 respectively of the multi-port valve irrespective of the linear position of the conduit member 276.

The inlet ports 278 of the cylindrical member 280 are arranged in a helical or spiral array about the upstanding wall portion of the cylindrical member 280, and in this example, 113 of these ports 278 are employed although a greater or lesser number obviously can be utilized. In this arrangement, however, the helical array of inlet ports 278 are disposed between alternating convolutions of a pair of V-shaped grooves 292 and 294. The grooves 292 and 294 constitute a two-start thread formed on the inner peripheral surface of the hollow cylindrical casing 280. The grooves 292 and 294 are continued to the top surface 295 of the cylindrical member 280, as indicated by dashed lines 297, to permit insertion and withdrawal of the conduit member 276 relative to the cylindrical casing, when a plug member 302 thereof is removed.

The conduit port selecting member 276 is elongated in the transverse direction and is of a generally parallelepiped configuration. At the lateral ends of the conduit member 276 are formed a pair of partial threads 296 and 298. The partial threads 296 are engaged in the spiral groove 292 while the partial threads 298 are engaged in the adjacent spiral groove 294. At each end of the conduit member 276 the partial threads 296 and 298 are disposed one on each side of the outward opening of the flow passage 282 or 284. With this arrangement, as the conduit member 276 traverses the inner cavity 300 of the cylindrical casing 280, the flow passages 282 and 284 of the conduit member can be aligned or coupled sequentially with each diametric pair, respectively, of the inlet ports 278.

In order to minimize leakage when the flow passages 282 and 284 of the conduit member 276 are so aligned, the end portions of the conduit member and the partial threads 296 and 298 thereof are machined to form a relatively close fit between these components and the associated threads 292 and 294 and inner periphery of the cylindrical casing 280. Improved sealing of the coupling between the outer openings of the flow passages 282 and 284 and the inner openings of the inlet ports 278 can be provided through use of a plastic or a hard bearing material provided at each of the conduit 276 and surrounding the outlet openings of its flow passages. Suitable examples of the aforesaid plastic or bearing material are noted in the aforementioned copending application. Usage of the V-shaped grooves 292 and 294 permit easier machining of the inner periphery of the cylindrical member 280.

The upper opening of the cylindrical casing 280 is closed by the aforementioned plug member 302, through which the conduit 274 communicates with the outlet port 290. To the upper surface of the plug member 302 however, is secured a thermal barrier 304 comprising a relatively short tubular supporting extenson 306 and a plurality of annular discs 308 secured transversely of the supporting extension 306. The driving shaft 270 is mounted for rotary and linear movement relative to the thermal barrier 304 and extends through the central cavity thereof. The driving shaft 270 fits relatively loosely within the aforementioned central cavity, and thus an annular flow passage 310 is formed between the supporting extension 306 and the driving shaft 270. The annular passage 310 serves to couple the conduit 274 through flow apertures 312 adjacent the upper end thereof and through a flow passage 313 of the plug member 302 with the outlet port 290. The annular passage 310 is isolated from the interior of the valve housing 10 by means of packing glands 314 and 316 in which the driving shaft 270 and the tubular conduit 274 are joined thereto are mounted for rotary and linear movement.

A keying member 318 is secured to the driving shaft 270 adjacent the upper end thereof, and is provided with a tab 320 joined to the outer periphery of a spacing flange 322 of the keying member. The tab 320 is cooperatively inserted in a longitudinal groove 324 formed at the inner periphery of an upper thermal barrier 326. Although similar to the lower thermal barrier 304, the latter thermal barrier differs therefrom in that it is provided with a larger central cavity 328 in order to permit insertion of the keying member 318. The upper thermal barrier 326 is rigidly secured to the lower end of the rotor 264 for rotation therewith by means of a plurality of cap screws 330. With this arrangement rotary motion is imparted to the driving shaft 270 and the conduit port selecting member 276 by means of the tab and groove arrangement 320 and 324. On the other hand, the tab and groove arrangement permits linear movement of the driving shaft 270, the keying member 318, and the port selecting member 276 as the latter traverses the threads 292 and 294 of the cylindrical member 280.

The keying member 318 is furnished with an elongated body portion 332, the diameter of which is limited to permit insertion of the body portion 332 and the upper end of the driving shaft 270 into a central cavity 334 of the rotor 264, as the port selecting member moves upwardly from its position shown in FIG. 6 of the drawings. The groove 324 which extends longitudinally of the upper thermal barrier 326 is of sufficient length to conform to the extent of travel of the port selecting member 276 and the components coupled thereto.

In this arrangement of the multi-port valve, the cylindrical casing 280, the lower thermal barrier 304, and the valve components associated therewith are supported within the valve housing 10' by means of a cartridge or shell member 336. The shell member is secured, as by welding, to mounting flange 338 of the cylindrical member 280 and is thus closely fitted and supported within the housing 10'. The upper thermal barrier 326, however, is supported together with the rotor 264 by means of a thrust bearing arrangement 340. The inner race 342 of the bearing 340 is clamped between offset portions 344 and 346 formed in the rotor 264 and the upper thermal barrier 326, respectively, adjacent the junction therebetween. The outer race 348 of the bearing 340 is supported upon an inwardly extending annular shoulder 350 of the housing 10' and is clamped in this position by the lower-threaded end 352 of the rotor housing 266.

In order to ascertain the position of the port selecting member 276 relative to the array of inlet ports 278, position indicating means are arranged in accordance with the invention to show the rotary and linear positions of the selecting member 276 and associated movable components of the valve mechanism. A suitable form of position indicating means presently to be described in greater detail is arranged to cooperate with a plurality of magnetic slugs or inserts, which obviously can be disposed at the outer periphery of either the rotor 266 or the upper thermal barrier 326. In the application of the invention illustrated in FIG. 6, however, the position indicating means is associated with the upper thermal barrier 326 and to this end the latter component is provided with a magnetic slug supporting flange 354.

The flanges 354 and adjacent components of the multi-port valve including the housing 10' desirably are formed from a non-magnetic material, such as non-magnetic stainless steel. The supporting flange extends outwardly toward the inner wall surface of the housing 10' and a plurality of magnetic slugs 356 are secured at spaced positions about the outer periphery of the flange 354 and near the wall of the housing 10'. The positions of the slugs 356 correspond to the vertical rows of inlet ports 278 which in this arrangement of the invention are grouped into twelve such rows. The magnetic slugs 356 cooperate with an E-core transformer arrangement denoted generally by the reference character 385 for determining the rotative position of the port selecting member and are generally similar to the magnetic slugs 34 of FIGS. 1 and 2 of the drawings.

In furtherance of this purpose, two legs 360 and 361 of the E-core transformer 385 (FIG. 6) are extended effectively through the adjacent wall portion of the housing 10' by means of the magnetic inserts 50 and 52, mentioned previously. In this arrangement, the magnetic inserts 50 and 52 are threadedly engaged into tapped cavities 100 and 102, respectively. The cavities 100 and 102 and the magnetic inserts 50 and 52 contained therewithin extend in this example to positions adjacent the inner wall surface 104 of the hermetically sealed housing 10'. When thus positioned, the inward ends of the magnetic inserts 50 and 52 are disposed adjacent the ends respectively of each of the magnetic slugs 356 when the latter are rotated by the rotor 264. Accordingly, a temporary magnetic coupling is established through the magnetic inserts 50 and 52 and that one of the magnetic slugs 356 which is disposed adjacent the inward ends thereof. This magnetic circuit is completed through the primary leg 360 and one of the secondary legs 361 of the E-core transformer 385.

The E-core transformer 385 in this arrangement is attached to a suitable mounting plate 106 which in turn is secured to the outer wall of the housing 10'. The central opening 108 of the mounting plate 106 provides clearance for the outward ends of the magnetic inserts 50 and 52 and for an adjustable magnetic slug 110 described more fully hereinafter. To provide adjustable support for the E-core transformer 385, a pair of lug members 114 and 116 are secured by means of their threaded studs 118 to generally opposite sides of the mounting plate 106. A cross piece 120 is then secured to the outward ends of the lug members 114 and 116 with the use of cap screws 122. An adjusting bracket 124 is secured to the core member 126 of the transformer 385 by means, for example, of rivets 128. To permit adjustability of the transformer 385, the bracket 124 is slidably mounted upon the cross piece 120. By insertion of the latter through a longitudinally extending aperture 130 of the bracket 124, the bracket 124 and hence the E-core transformer 385 can be secured at selected vertical positions along the length of the cross piece 120 by tightening a pair of set screws 132.

The central leg 360 of the E-core transformer 385 is provided with a primary winding 134 adapted to be energized from a suitable source of alternating voltage. The secondary legs 361 and 136 similarly are provided with secondary windings 138 and 140, respectively. In this example, the secondary windings are coupled in electrical opposition as described hereinbefore in connection with FIGS. 1 to 5 of the drawings.

The secondary winding 140 normally is magnetically coupled to the primary winding 134 by means of the adjustable magnetic slug 110. However, the position of the magnetic slug 110 is substantially fixed during operation of the position indicator and is similar to the magnetic slug 58 illustrated in FIGS. 1 and 2 of the drawings. In the arrangement of FIG. 6, moreover, the magnetic slug 110 is provided with means for adjusting the position thereof in order that the desired nulled or substantially diminished output is attained as each of the magnetic slugs 356 are in turn juxtaposed in the magnetic inserts 50 and 52.

To provide the aforesaid adjustability for the magnetic slug 110, the latter is mounted upon the movable plate 142. The plate 142 is provided with a pair of slots 144 disposed respectively adjacent the ends of the plate 142, through which slots a pair of mounting bolts 146 are inserted and threaded into suitable tapped apertures, not shown, of the hermetically sealed housing 10'. The use of the slotted mounting plate 142 thus provides generally vertical adjustment of the magnetic slug 110. Outward lateral adjustment thereof is afforded through the use of a shim plate 148 inserted between the mounting plate 142 and the outer wall surface of the housing 10'. The magnetic slug 110 is secured to the mounting plate 142 by means of a single cap screw 150 thereby providing angular adjustability for the magentic slug 110. Finally, adjustment of the magnetic slug 110 in a direction transversely or circumferentially of the housing 10' is afforded by means of a slot 152 extending substantially horizontally in the magentic slug 110.

It is contemplated that the magnetic slug 110 will be fabricated from a magnetic material and thus a fixed rate of magnetic coupling between the central or primary leg 360 and the secondary leg 136 of the E-core transformer will be obtained, once the slug 110 has been adjusted, during operation of the position indicator. The adjustable magnetic slug 110 is then arranged in one example of the invention such that the aforesaid rate of coupling between the legs 360 and 136 will be approximately equal to the coupling rate between the primary leg 360 and the other secondary leg 361 when one of the magnetic slugs 356 are juxtaposed to the inward ends of the magnetic inserts 50 and 52. With this arrangement, then, the series of the output voltage troughs described heretofore in connection with FIGS. 1 to 5 of the drawings will be obtained during operation of the multi-port valve and of the rotary position indicator associated therewith.

When the multi-port valve described heretofore is being operated, a null or minimum output voltage occurs in the secondary circuit of the E-core transformer 385 as each one of the magnetic slugs 356 is aligned with the legs 360 and 361 of the E-core transformer. As described heretofore, twelve such null points occur during each revolution of the driving shaft 270 and of the port selecting member 276, and the slugs 356 are positioned about the periphery of the supporting flange 354 such that each null point occurs when the selecting member 276 is aligned angularly with a given pair of inlet ports 278. As pointed out heretofore, these null points also occur as the ends of the port selecting member 276 are aligned with diametrically opposed vertical rows of inlet ports 278. Consequently, by coupling suitable pulse counting circuitry described hereinafter in connection with FIG. 7 of the drawings, in the secondary circuit of E-core transformer 385, the linear position as well as the rotary position of the port selecting member 276 will be indicated, inasmuch as twelve such pulses in this exemplary arrangement are equivalent to one revolution of the selection member 276. Thus, when the conduit member 276 is traversed relative to the inlet ports 278 by energization of the rotor 264, the limits of travel of the conduit member 276 are defined respectively by suitable stop members, for example, pins 364 and 366 secured to the plug member 302 and the bottom wall portion of the cylindrical member 280. The particular pair of ports coupled to the conduit 276 at a given time can be ascertained therefore by counting the output pulses of the E-core transformer 385, as the conduit member is moved from one or the other of pins 364 and 366.

When the aforementioned pulse counting circuitry is actuated and the total number of pulses or null points obtained correspond to one traverse of the port selecting member 276 through the helical threads 296 and 298, another circuit arrangement is energized for reversing the driving means including the rotor 264 to cause the port selecting member to return to the place of beginning, for example, to the position adjacent the upper stop pin 364. It is contemplated that the port selecting member, when being thus rotated in its reverse direction, also can be stopped sequentially at each pair of the ports 278. However, in the case of the exemplary controlling circuit presently to be described, this indexing movement of the port selecting member 276 is terminated and the selecting member is moved continuously during its reverse travel. In this arrangement, then, the port selecting member is stopped or indexed at each pair of ports 278 in one direction only of its travel through the cylindrical member 280.

Referring now to FIG. 7 of the drawings, the rotary position indicator forming the subject of the invention is shown therein in conjunction with exemplary controlling circuitry arranged in accordance with the invention. As described more fully in connection with FIG. 6 of the drawings, the E-core transformer 358 is arranged for cooperation with a plurality of magnetic slugs 356 mounted upon the supporting flange 354 forming part of the multi-port valve denoted generally by the reference character 400. In this application of the invention, the multi-port valve 400 and the supporting flange 354 are rotated by a "canned" induction type motor, denoted generally by the reference character 402, such as that shown partially in FIG. 6 of the drawings and described more fully in the aforesaid copending application.

When thus operated, the multi-port valve 400 selectively samples a pair of a plurality of input streams 404 which are conducted to the valve 400 from a suitable testing station 406. The samples selected by the multi-port valve 400 at a given time are conducted to a pair of monitoring stations 408 and 410 through the outlet ports 288 and 290 of the multi-port valve. At the monitoring stations 408 and 410, the samples thus collected by the multi-port valve 400 can be tested for any desired characteristics such as radioactivity, inclusion of foreign matter, relative quantities of solvent and solute or the like, as described in the aforesaid copending application.

In order to obtain these pairs of samples, from the outlet ports 288 and 290, as aforesaid, the driving motor 402 of the multi-port valve is actuated by the controlling circuitry of FIG. 7 to cause the port selecting member 276 to stop at each diametrically opposed pair of ports 278 for a time interval sufficient to permit collection of the desired samples by way of the valve outlet ports 288 and 290. Stated in another manner, the circuitry of FIG. 7 imposes an indexing signal upon the power supply for the driving motor 402 during the transverse of the port selecting member 276 in one direction through the cylinder 280. In other direction of travel, the aforesaid indexing signal is over-ridden or decoupled from the driving motor 402 so that the port selecting member 276 is quickly returned to the place of beginning in preparation for another indexing traverse relative to the ports 278. When the multi-port valve 400 is hermetically sealed, as illustrated in FIG. 6, means are provided in accordance with the invention for reversing the driving motor 402 without the provision of limit switches or the like within the housing 10' of the multi-port valve 400.

In the operation of the invention, the primary winding 134 of the E-core transformer 358 is energized from a suitable alternating potential source denoted generally by the reference numeral 412. Such source may be a line voltage having a normal frequency of 60 cycles per second. The secondary windings 138 and 140 of the E-core transformer 358 are coupled, in this example, in electrical opposition to a rectifier bridge 414. A loading condenser 416 is connected in parallel to the rectifier bridge 414 in order to reduce the impedance of the secondary windings 138 and 140. The output of the rectifier bridge 414 is coupled through conductors 418 to a filter network including a choke 420, a resistance 422 and a condenser 424. The last-mentioned circuit components serve the purpose of substantially removing the line ripple in the direct current output of the rectifier bridge 414. The output of the rectifier bridge 414 then, during operation of the position indicator, will consist of a normal direct current voltage induced in the secondary winding 140 by coupling of the fixed magnetic slug 110 as described heretofore. The normal direct current output, however, will be modulated to a minimum or null value by passage of individual ones of the magnetic slugs 356 relative to the transformer legs 360 and 361, thereby coupling the secondary winding 138 to the primary winding 134.

The output voltage of the E-core transformer 358 is then applied to the base electrodes of a transistor amplifier including the transistors 426 and 428, through conductors 430 and 432 coupled respectively to the output leads 418 of the rectifier bridge 414. A current limiting resistance 434 or 436 is coupled in series with each of the base electrodes 425. Two of the current limiting resistances 436 are made adjustable in order to compensate for variations in line voltage and to adjust the control current for a pair of dual core, bistable magnetic amplifiers denoted generally by the reference characters 438 and 440, respectively, and arranged in accordance with a suitable well-known design.

In this arrangement, each pair of transistors 426 and 428 are operated in a conventional manner as a linear amplifier having a parallel input and a push-pull output, with the signal to be amplified being applied to the base electrodes 425 as aforesaid. The power supply for each transistor amplifier 426—428 is furnished in this arrangement in the form of a transformer 442 having its primary winding 444 coupled to the alternating source 412. The secondary winding 446 of the power supply transformer 442 is centertapped through biasing resistors 448 to the emitter electrodes 450 of the transistors 426 and 428. The outer ends of the secondary winding 446 are coupled through a full-wave rectifying network including the rectifiers 452 and a pi filter network of condensers 454 and resistance 456 to the base electrodes 425 of the transistors 428. The base electrodes 425 of the other transistors 426 similarly are coupled to the full-wave rectifier 452 through the filter resistance 422, conductor 418, and a biasing rectifier 458 to the center tap 460 of the secondary winding 446.

With this arrangement, the output of each pair of transistors 426 and 428 is supplied from the collector electrodes 462 thereof to the associated magnetic amplifier 438 or 440, respectively. In furtherance of this purpose, the emitter electrodes 462 of each pair of transistors are coupled respectively to control or signal windings 464 of the associated magnetic amplifier through a pair of conductors 466. A pair of current limiting resistances 468 are coupled respectively in the conductors 466 in order to match impedances of each transistor amplifier 426—428 with the associated magnetic amplifier 438 or 440. The signal thus applied to the magnetic amplifiers 438 and 440 through the control windings 464 thereof is returned to the transistor amplifier through a common conductor 470 coupled to each of the control windings 464.

A pair of load windings 472 of each magnetic amplifier 438 or 440 are coupled by means of a common lead 474 to one side 476 of the alternating current source 412. The other side 477 of the source 412 is coupled to the load windings 472 through a pair of contacts 478 of a reversing relay switch denoted generally by the numeral 480 and described hereinafter in greater detail. From the contacts 478 of the relay switch 480, the other side 477 of the source 412 is coupled to a second common lead 482 and thence to a pair of self-saturating rectifier bridge networks 484 and 486. The rectifier bridges 484 and 486 are coupled respectively to the load windings 472 of the magnetic amplifiers 438 and 440 through suitable current limiting resistances 488 and 490. The output path of each rectifier bridge 484 or 486 is coupled in series-parallel with a current limiting resistance 492 and a biasing winding 494 or 496 of the magnetic amplifier 438 or 440, respectively.

It will be seen thus far that the signal paths through each transistor amplifying circuit 426—428 and the associated magnetic amplifier 438 or 440 are identical. The magnetic amplifier 438, however, is an on-sensitive bistable amplifier and is arranged with its biasing winding 494 having relatively the same polarity as that of the control or signal windings 464 so that the effects of the signal and bias voltages will add when the input signal voltage is at or near its maximum and thus cause the magnetic amplifier 438 to be energized when a magnetic slug 356 is not juxtaposed to the E-core transformer 358. Thus the magnetic amplifier 438 will be deenergized when one of the slugs 356 is adjacent the legs 360 and 361 of the E-core transformer. On the other hand, the magnetic amplifier 440 is an off-sensitive bistable amplifier and normally is biased to the firing state by the winding 496, which is reversed relative to winding 494 of the magnetic amplifier 438, so that the magnetic amplifier 440 will be energized when the input signal voltage applied to the windings 464 thereof is at the minimum or null point. Accordingly, the magnetic amplifier 440 will fire only when one of the magnetic slugs 356 is juxtaposed to the E-core transformer 358. As described heretofore, when one of the magnetic slugs 356 is so juxtaposed, the port selecting member 276 (FIG. 6) is aligned precisely with a given pair of the inlet valve ports 278. On the other hand, when the output signal of the E-core transformer 358 is at a maximum, the port selecting member 276 is not aligned with one of the aforesaid pairs of ports. With this circuit arrangement, then, the magnetic amplifier 440 will fire when the port selecting member 276 is coupled to a pair of the inlet ports 278 but the magnetic amplifier 438 will fire when the port selecting member 276 is not so coupled and is traversing between adjacent diametric pairs of the inlet ports 278.

These more or less opposing signals of the magnetic amplifier 438 and 440, respectively, are utilized to index the driving motor 402 of the multi-port valve 400 during traversing of the port selecting member 276 in one direction as aforesaid. This indexing or starting or stopping of the driving motor 402 is accomplished in accordance with the invention through a suitable relay network, the action and timing of which is controlled or initiated by the magnetic amplifier signals mentioned previously. Therefore, the outputs of the rectifier bridges 484 and 486 of the magnetic amplifiers 438 and 440, respectively, are coupled additionally in series to a feedback winding 495 and a relay switch 497 or 498. A peaking or loading condenser 500 is coupled in parallel to relay coil 502 of each switch 497 or 498 to reduce the impedance thereof.

When thus connected, the coil 502 of the relay switch 497 will be energized by the magnetic amplifier 438 when the port selecting member (FIG. 6) is not aligned with a given pair of inlet ports 278. On the other hand, coil 502 of the relay switch 498 will be energized only during the time in which the port selecting member 276 is aligned with a given pair of inlet ports. Moreover, circuit means are provided, as described hereinafter, for permitting energization of the relay switches 497 and 498 during traverse of the port selecting member in only one direction relative to the port cylinder 180 (FIG. 6). Additional circuit means are provided in accordance with the invention for controlling the length of the time intervals in which the relay switch 497 is energized and deenergized.

The latter switch is coupled to pairs of contacts 504 and 506 of the relay switch 498 which are coupled respectively in direct current busses 508. The direct current busses 508 are connected through normally closed contacts 510 and 512 of the relay switch 480 and through conductors 513 to armature 514 of the driving motor 402. Coupled in series with the armature 514 is a speed adjusting, variable resistance 516.

With this arrangement, then, the contacts 504 and 506 and the direct current busses 508 are maintained in the closed condition by the output or load voltage of the magnetic amplifier 438 when the port selecting member is not aligned with a pair of inlet ports 278, that is to say when one of the magnetic slugs 356, which are aligned with the vertical rows of inlet ports 278 as aforesaid, is not juxtaposed with the E-core transformer 358. However, when the port selecting member is aligned with one of the ports, the relay 497 is not energized by the magnetic amplifier 438 and therefore, the driving motor 402 can not be energized by the magnetic amplifier 438 and associated circuitry. Accordingly, circuit means described hereinafter are provided for energizing the relay switch 497 before the relay switch 498 is deenergized.

As stated previously, the relay switch 498 is energized by the magnetic amplifier 440 only when the port selecting member 276 is aligned with a given pair of inlet ports 278. When this occurs, the relay switch 498 closes a first pair of contacts 518 momentarily in order to apply an electric pulse to a stepping switch denoted generally by the reference numeral 520 and coupled across the alternating current source 412 by means of conductors 522 and 524. The stepping switch 520 is conventional in construction and for each pulse so applied thereto, a movable contact 526 of the stepping switch 520 is coupled progressively to the contacts 528 of the stepping switch.

The aforesaid pulse occurs at each indexing movement of the driving motor 402. Each contact 528 of the stepping switch is connected respectively to one of a plurality of indicator lamps 530, which in turn are coupled to the source 412 through a common conductor 532 and the alternating current lead 476. As a result, the indicator lamps 530 are energized singly and progressively as the port selecting member 276 is coupled progressively to pairs of the inlet ports 278. As a result, the instant coupling position of the port selecting member relative to the array of inlet ports 278 can be ascertained with a glance at the indicator lamp arrangement 530.

In order to initiate operation of the driving motor 402, for the purposes of indexing the port selecting member 276 to the next succeeding pair of inlet ports 278, means are provided for momentarily applying potential to the motor 402, when the port selecting member is still aligned with the preceding pair of ports and consequently no signal is yet applied by the magnetic amplifier 440 to the relay switch 497. One form of such means includes a pair of contacts 542 which are disposed in an alternate supply circuit for the relay 497 and which are coupled to a time-delay relay 544. Thus, upon closure of the contacts 542, line voltage from the alternating source 412 can be applied, through leads 536 and 538, to a voltage-dropping resistance 540 and the contacts 542, when closed. However, closure of the contacts 542 is delayed as described hereinafter to determine the duration of the period in which the port selector 276 is stopped at each pair of ports 278. The auxiliary potential source for the relay switch 497 is rendered unidirectional by means of the rectifier 546 and flow from the auxiliary supply through the magnetic amplifier 438 is prevented by means of another rectifier 548.

However, before initiating operation of the driving motor 402 for indexing movement to the succeeding pair of ports 278, the driving motor and the port selecting member 276 are maintained in their stopped positions for a time sufficient to permit collection of samples from the coupled pair of the inlet ports 278, via the outlet ports 288 and 290, respectively, and for subsequent monitoring or analysis at the testing stations 408 and 410. The duration of this stopping period at each pair of ports 278 is controlled by the aforesaid time delay relay 544 which is coupled across the alternating current source 412 at the same moment the relay switch 498 coupled to the magnetic amplifier 440 is energized. This is accomplished by closure of a second pair of contacts 550, which are connected in series with the switch 544 and therefore couple coil 552 of the relay switch 544 to the conductors 522 and 524 and thence to the source 412. The relay switch 544 is provided with known time delay means which prevent closure of its contacts 542 and consequently energization of the relay switch 497 for the desired duration of coupling between the port selecting member 276 and each pair of the inlet ports 278. The switch 544 thus will close a certain interval after closure of the relay switch 498, but will remain closed only for a time sufficient to start the driving motor 402 after which the relay 497 becomes energized by the output of the magnetic amplifier 438. Thereupon, the time delay switch 544 is opened by opening of contacts 550 of the relay switch 498 since the latter is no longer energized when the port selector 276 is moved out of alignment with a pair of ports 278. However, the relay switch 497 remains energized by the output of the magnetic amplifier 438 until the next pair of inlet ports 278 are coupled by the port selecting member 276.

With this arrangement, the driving motor 402 and the port selecting member 276 coupled thereto are indexed throughout the forward traverse of the port selecting member 276, until the port selecting member 276 reaches in this arrangement the upper limit of its travel as determined by the stop pin 364 located at the upper end of the supporting cylinder 280 (FIG. 6). At the latter position of the port selecting member, the upper stop pin 364 permits rotation of the port selecting member beyond the last or uppermost pair of inlet ports 278 so that in this application, there is no flow outwardly through the ports 288 and 290 of the multi-port valve 200.

At this position of the port selector 276, the stepping switch 520 of the indicator light system has reached the most remote contact 528A thereof and thereby couples a time delay relay switch 554 across the source 412 via the stepping switch 520 and conductors 556 and 524. Closure of the relay switch 554 operates to bridge contacts 558, which in turn, energizes the reversing relay switch 480. The switch 480 then operates to reverse the motor 402 by reversing the armature connections thereto. However, the reversing relay switch 480 is not operated in this arrangement of the invention until relay switches 560 and 562 are closed, the purposes and operation of which are enumerated subsequently.

Energization of the time delay switch 554 also operates to open the normally closed contacts 564 and thereby to throw a current limiting resistance 566 into the armature circuit of the driving motor 402. The incorporation of the current limiting resistance 566 will reduce substantially the driving torque of the motor 402 when operated during the non-indexing reverse traverse of the port selector 276, so that the port selector is stopped easily by the lower stop pin 366 (FIG. 6) at the end of the reverse traverse or when the port selector has reached the place of beginning just beyond the lowermost pair of inlet ports 278a.

However, in order to minimize the time consumed in the reverse travel of the port selector 276, the torque reducing resistance 566 desirably is not inserted into the armature circuit of the motor 402 until a short distance before the end of the reversing traverse. This delayed insertion of the resistance is accomplished by means of the time-delay relay 562 which is energized by closure of a pair of contacts 568 associated with the reversing relay switch 480. The time delay switch 562, after a predetermined interval, then closes another pair of contacts 570 which are coupled in parallel in the resistor bypassing circuit with the relay contacts 564 of the time delay relay 554.

On the other hand, the time delay relay 562 is provided with means to prevent energization thereof for an interval after closure of the contacts 568. This interval is made approximately equal to the time consumed by the reverse or non-indexing traverse of the motor 402 and port selector 276, so that the contacts 570 are not opened until just before the port selector 276 reaches the end of its reverse traverse. Since both pairs of contacts 564 and 570 of the relay switches 554 and 562, respectively, must be opened in order to insert the resistance 566 in the armature circuit, it will be apparent that the resistance 566 is not so inserted until the port selector 276 has very nearly reached the end of its reverse traverse.

In certain applications of the invention, it is desirable to delay commencement of a subsequent indexing or forward traverse of the port selecting member 276 until the flow of fluid from the multi-port valve 400, via the outlet contacts 288 and 290 substantially has ceased. In this fashion, any possibility of contaminating subsequent samples is avoided. Therefore, in accordance with the invention, the relay switch 560 is coupled in parallel with the time delay relay switch 554 to the contact 528a of the stepping switch 520. However, the relay switch 560 is controlled by conventional flow-metering circuitry denoted generally by the reference character 572 in a known manner such that the relay switch 560 will remain energized until the flow of fluid through both the outlet conduits 288 and 290 of the multi-port valve 400 substantially ceases. The contacts 574 of the flow meter controlled relay switch 560 are coupled in parallel with the contacts 558 of the time delay switch 554 and thus both of the relay switches 574 and 554 must be opened before the reversing switch 480 is deenergized to commence a subsequent forward traverse of the port selector 276. Thus, the port selecting member 276 is maintained in its reverse traverse throughout the period determined by the time delay switch 554 and for an additional period by the flow-meter controlled switch 560, if required to permit termination of flow of fluid outwardly of the multi-port valve 400. As stated heretofore, during energization of the reversing switch 480, the indexing signal supplied by the magnetic amplifier 438 and the indicator light stepping signal supplied by the magnetic amplifier 440 are terminated by opening of the normally closed contacts 478 associated with the relay switch 480. Opening of the latter contacts, of course, interrupts the load current supplied to the magnetic amplifiers via conductors 477, 576 and the common conductor 482.

From the foregoing, it will be apparent that novel and efficient forms of rotary position indicating and controlling circuitry have been disclosed herein. It is intended that the descriptive and illustrative materials employed herein be utilized for purposes of exemplifying the invention and not be interpreted as limitative thereof.

Therefore, numerous modifications of the invention will occur to those skilled in the art without departing from the spirit and scope of the invention. Moreover, it is to be understood that certain features of the invention can be utilized without a corresponding use of other features thereof.

Accordingly, what is claimed as new is:

1. A position indicating system adapted for use with a movable member, said system comprising an E-core transformer, a primary winding disposed on one of the legs of said E-core transformer, secondary windings disposed on the remaining legs, respectively, of said transformer, at least one magnetic member mounted for movement with said movable member, said magnetic member being disposed to effect magnetic coupling only between said primary leg and one of said secondary legs of said transformer at least once during movement of said movable member, means for adjusting the magnetic coupling between said primary leg and the other of said secondary legs including a relatively fixed magnetic member, mounted always in a position of magnetic coupling relative to said primary leg and to the other of said secondary legs, means for varying said position and circuit means for combining the outputs of said secondary windings.

2. A position indicating system adapted for use with a movable member, said system comprising a transformer having a primary portion and a pair of secondary portions, a primary winding disposed on said primary portion, a pair of secondary windings disposed respectively on said secondary portions, circuit means for coupling said primary winding to a source of fluctuating potential and for combining the outputs of said secondary windings, a magnetic member mounted on said movable member for movement therewith, said magnetic member being disposed for movement to a position of magnetic coupling relative to said primary portion and only one of said secondary portions at least once during movement of said movable member, means for adjusting the magnetic coupling between said primary leg and the other of said secondary legs including a relatively fixed magnetic member mounted always in a position of magnetic coupling relative to said primary portion and to the other of said secondary portions and means for varying said position.

3. A position indicating system adapted for use with a movable member, said system comprising a transformer having a primary leg and a pair of secondary legs, a primary winding disposed on said primary leg, a pair of secondary windings disposed respectively on said secondary legs, circuit means for coupling said primary winding to a source of fluctuating potential, additional circuit means for combining the outputs of said secondary windings in electrical opposition, a magnetic member mounted on said movable member for movement therewith, said magnetic member being disposed for movement to a position of magnetic coupling relative to said primary leg and to only one of said secondary legs at least once during each movement of said movable member, means for adjusting the magnetic coupling between said primary leg and the other of said secondary legs including a relatively fixed magnetic member mounted always at a position of magnetic coupling relative to said primary leg and to the other of said secondary legs, and means for varying said position.

4. A rotary position indicating system comprising a transformer having a primary leg and a pair of secondary legs, a primary winding disposed on said primary leg, a pair of secondary windings disposed respectively on said secondary legs, circuit means for coupling said primary winding to a source of fluctuating potential and for combining the outputs of said secondary windings, a plurality of spaced magnetic members mounted about the periphery of a rotatable member, said magnetic members being disposed for movement to a magnetic coupling position relative to said primary leg and to only one of said secondary legs, means for adjusting the magnetic coupling between said primary leg and the other of said secondary legs including a relatively fixed magnetic member mounted always at a position of magnetic coupling relative to said primary leg and to the other of said secondary legs and means for varying said position.

5. A rotary position indicating system adapted for use with a member which is rotatable to a plurality of angular positions thereof, said system comprising a transformer having a primary leg and a pair of secondary legs, a primary winding disposed on said primary leg and a pair of secondary windings disposed respectively on said secondary legs, circuit means for connecting said primary winding to a source of fluctuating potential and for combining the outputs of said secondary windings, a plurality of magnetic members mounted on said rotatable member at positions relatively aligned with said angular positions, respectively, said magnetic members each being movable to a position of magnetic coupling relative to said primary leg and to only one of said secondary legs during rotation of said rotatable member, means for adjusting the magnetic coupling between said primary leg and the other of said secondary legs including a relatively fixed magnetic member mounted always at a position of magnetic coupling relative to said primary leg and the other of said secondary legs, whereby an electrical pulse appears in said secondary windings as said rotatable member is moved to each of said angular positions thereof and means for varying said position.

6. A rotary position indicating and controlling system adapted for use with a rotatable member and driving means for rotating said member, said system comprising a transformer having a primary leg and a pair of secondary legs, a primary winding disposed on said primary leg, a pair of secondary windings disposed respectively on said secondary legs, at least one magnetic member mounted on said rotatable member for rotation therewith, said magnetic member being movable to a position of magnetic coupling relative to said primary leg and one of said secondary legs at least once during each revolution of the rotatable member, a relatively fixed magnetic member, means for mounting said fixed magnetic member at a position of magnetic coupling relative to said primary leg and to the other of said secondary legs, circuit means for coupling said primary winding to a source of fluctuating potential and for combining the outputs of said secondary windings whereby a pulse appears in said secondary circuit means when said first mentioned magnetic member is moved to its coupling position, circuit means for starting and stopping said driving means, and additional circuit means coupled to said secondary windings for actuating said starting and stopping circuit sequentially.

7. A rotary position indicating and controlling system adapted for use with a rotatable member and driving means for rotating said member, said system comprising a transformer having a primary leg and a pair of secondary legs, a primary winding disposed on said primary leg, a pair of secondary windings disposed respectively on said secondary legs, at least one magnetic member mounted on said rotatable member for rotation therewith, said magnetic member being movable to a position of magnetic coupling relative to said primary leg and one of said secondary legs at least once during each revolution of the rotatable member, a relatively fixed magnetic member, means for mounting said fixed magnetic member at a position of magnetic coupling relative to said primary leg and to the other of said secondary legs, circuit means for coupling said primary winding to a source of fluctuating potential and for combining the outputs of said secondary windings, whereby a pulse appears in said secondary circuit means when said first mentioned magnetic member is moved to its coupling position, additional circuit means for coupling said secondary output to a pair of parallel amplifying circuits, means for biasing one of said amplifying circuits to produce an output signal when said secondary output is at a minimum voltage, means for biasing the other amplifying circuit to produce an output when said secondary output is at a maximum voltage, circuit means coupled to said one amplifying circuit for starting and stopping said driving means, and circuit means coupled to said other amplifier for reversing said driving means, after a predetermined number of the starting and stopping operations.

8. A position indicating system adapted for use with a movable member, said system comprising a transformer having a primary leg and a pair of secondary legs, a primary winding disposed on said primary leg, a pair of secondary windings disposed on said secondary legs, circuit means for coupling said primary winding to a source of fluctuating potential and for combining the ouputs of said secondary windings, a magnetic member mounted on said movable member for movement therewith, said magnetic member being disposed for movement to a position of magnetic coupling relative to said primary leg and to only one of said secondary legs at least once during movement of said movable member, means for adjusting the magnetic coupling between said primary leg and the other of said secondary legs including a relatively fixed magnetic member disposed always at a position of magnetic coupling relative to said primary leg and to the other of said secondary legs, and adjustable mounting means for mounting said relatively fixed magnetic member.

References Cited in the file of this patent
UNITED STATES PATENTS

| | | |
|---|---|---|
| 1,887,713 | Gunn | Nov. 15, 1932 |
| 2,053,154 | La Pierre | Sept. 1, 1936 |
| 2,466,028 | Klemperer | Apr. 5, 1949 |
| 2,662,301 | Beach | Dec. 15, 1953 |
| 2,700,758 | Smith | Jan. 25, 1955 |
| 2,730,664 | Karlson | Jan. 10, 1956 |
| 2,731,599 | Groeper | Jan. 17, 1956 |